United States Patent [19]

Yong et al.

[11] 4,414,117
[45] Nov. 8, 1983

[54] DECARBONATION OF TAILINGS SLUDGE TO IMPROVE SETTLING

[75] Inventors: Raymond N. Yong; Amar J. Sethi, both of Beaconsfield, Canada

[73] Assignee: Suncor, Inc., Toronto, Canada

[21] Appl. No.: 416,729

[22] Filed: Sep. 10, 1982

Related U.S. Application Data

[63] Continuation-in-part of Ser. No. 262,143, May 11, 1981, abandoned.

[51] Int. Cl.³ .............................................. C02F 11/14
[52] U.S. Cl. ............................... 210/710; 208/11 LE; 210/718; 210/727; 210/731
[58] Field of Search ................... 208/11 LE; 210/702, 210/705, 708, 714, 723–728, 731, 738, 751, 718, 710

[56] References Cited

U.S. PATENT DOCUMENTS

| | | | |
|---|---|---|---|
| 3,526,585 | 9/1970 | Camp | 208/11 LE |
| 3,816,305 | 6/1974 | Schutte | 208/11 LE |
| 4,036,752 | 7/1977 | Lassiter | 210/714 |
| 4,225,433 | 9/1980 | Liu et al. | 208/11 LE |
| 4,229,295 | 10/1980 | Krofchak | 210/751 |
| 4,282,103 | 8/1981 | Fuhe et al. | 208/11 LE |
| 4,330,409 | 5/1982 | Yong et al. | 210/731 |

FOREIGN PATENT DOCUMENTS

| | | |
|---|---|---|
| 882668 | 10/1971 | Canada . |
| 892548 | 2/1972 | Canada . |
| 1000632 | 11/1976 | Canada . |
| 1021885 | 11/1977 | Canada . |
| 2027684 | 2/1980 | United Kingdom ................ 210/731 |

Primary Examiner—Peter A. Hruskoci
Attorney, Agent, or Firm—Paul Lipsitz

[57] ABSTRACT

Carbonates and bicarbonates are removed from the sludge of tar sands tailings ponds whereby solids settle from the sludge more rapidly than in the presence of the carbonates and/or bicarbonates. Hydrolyzed starch is used as a flocculant in the process and alcohol may also be used to assist in the settling and/or to improve the characteristics of the settled sludge for subsequent dewatering.

12 Claims, 1 Drawing Figure

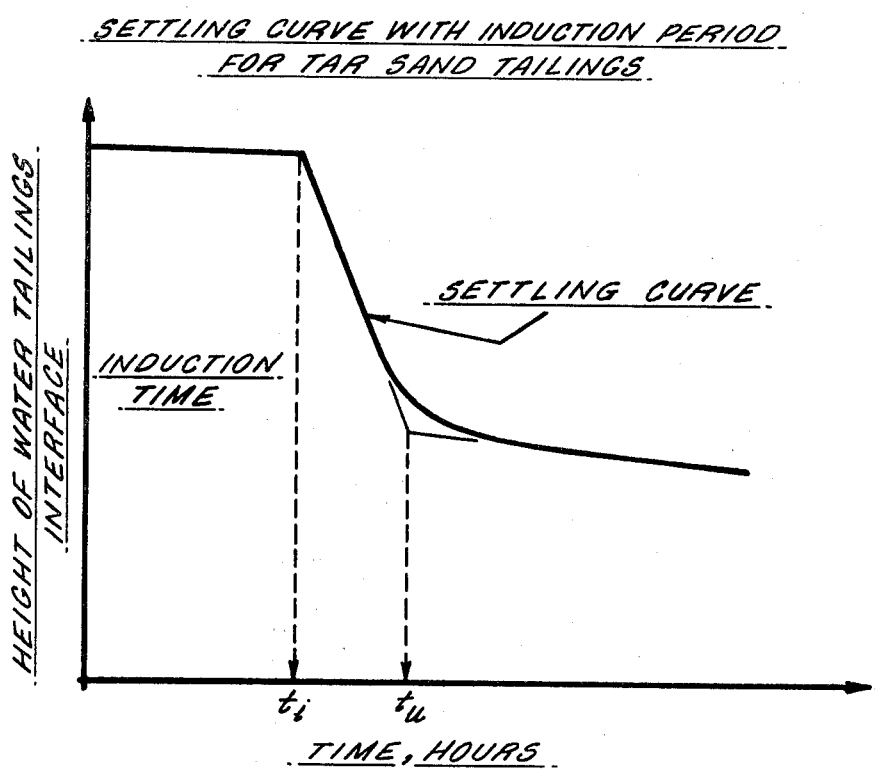

DECARBONATION OF TAILINGS SLUDGE TO IMPROVE SETTLING

This application is a continuation-in-part of U.S. Ser. No. 262,143 filed May 11, 1981, now abandoned.

BACKGROUND OF THE INVENTION

This invention relates to the discovery that removal of carbonates and bicarbonates from a tailings material effects more rapid settlement of solids in the tailings sludge suspension.

In general, these sludge suspensions are aqueous colloidal suspensions containing either clay minerals or metal oxides-hydroxides which are formed in large volume during mining operations in the recovery of such materials as coal, bitumen from tar sands, and metals. In the case of metal mining operations, suspensions known as slimes are formed, typically phosphate slimes or like materials produced in the mining of copper, nickel, and titanium. In coal and tar sands minings, for example, the mining effluent typically contains dilute or thick clay mineral suspensions.

In order to properly dispose of these voluminous mining discharges, regardless of their source, flocculants have conventionally been employed to destablize these suspensions and thus permit the effective separation of water from solids.

This invention relates to the treatment of tailing pond water obtained from the hot water process for treating bituminous sands, such as Athabasca tar sands, and, more particularly, to the treatment of the water and clay-containing effluent discharged from the process.

Tar sands (which are also known as oil sands and bituminous sands) are sand deposits which are impregnated with dense, viscous petroleum. Tar sands are found throughout the world, often in the same geographical area as conventional petroleum. The largest deposit, and the only one of present commercial importance, is in the Athabasca area in the northeast of the Province of Alberta, Canada. This deposit is believed to contain over 700 billion barrels of bitumen. For comparison, this is just equal to the world-wide reserves of conventional oil, 60% of which is found in the middle east.

Athabasca tar sand in a three-component mixture of bitumen, mineral and water. Bitumen is the material for which tar sands are mined and processed. The bitumen content is variable averaging 12 wt.% of the deposit, but ranging from 0 to 18 wt.%. Water typically runs 3 to 6 wt.% of the mixture, increasing as bitumen content decreases. The mineral content is relatively constant ranging from 84 to 86 wt.%.

Several basic extraction methods have been known for many years for separating the bitumen from the sands. In the so-called "cold water" method, the separation is accomplished by mixing the sands with a solvent capable of dissolving the bitumen constituent. The mixture is then introduced into a large volume of water, water with a surface agent added, or a solution of a neutral salt in water. The combined mass is then subjected to a pressure or gravity separation.

The hot water process for primary extraction of bitumen from tar sands consists of three major process steps and a fourth step, final extraction, is used to clean up the recovered bitumen for downstream processing. In the first step, called conditioning, tar sand is mixed with water and heated with open steam to form a pulp of 70 to 85 wt.% solids. Sodium hydroxide or other reagents are added as required to maintain pH in the range of 8.0–8.5. In the second step, called separation, the conditioned pulp is diluted further so that settling can take place. The bulk of the sand-size mineral rapidly settles and is withdrawn as sand tailings. Most of the bitumen rapidly floats (settles upward) to form a coherent mass known as froth which is recovered by skimming the settling vessel. A third stream may be withdrawn from the settling vessel. This stream, called the middlings drag stream, may be subjected to a third processing step, scavenging. This step provides incremental recovery of suspended bitumen and can be accomplished by conventional froth flotation.

The mineral particle size distribution is particularly significant to operation of the hot water process and to sludge accumulation. The terms sand, silt, clay, and fines are used in this specification as particle size designations wherein sand is siliceous material which will not pass a 325 mesh screen. Silt will pass 325 mesh, but is larger than 2 microns, and clay is material smaller than 2 microns including some siliceous material of that size.

Conditioning tar sands for the recovery of bitumen consists of heating the tar sand/water feed mixture to process temperature (180°–200° F.), physically mixing the pulp to uniform composition and consistency, and the consumption (by chemical reaction) of the caustic or other reagents added. Under these conditions, bitumen is stripped from the individual sand grains and mixed into the pulp in the form of discrete droplets of a particle size on the same order as that of the sand grains. The same process conditions, it turns out, are also ideal for accomplishing deflocculation of the clays which occur naturally in the tar sand feed. Deflocculation, or dispersion, means breaking down the naturally occurring aggregates of clay particles to produce a slurry of individual particles. Thus, during conditioning, a large fraction of the clay particles become well dispersed and mixed throughout the pulp.

Those skilled in the art will therefore understand that the conditioning process, which prepares the bitumen for efficient recovery during the subsequent process steps also cause the clays to be most difficult to deal with in the tailings disposal operations.

The second process step, called separation, is actually the bitumen recovery step (the separation having already occurred during conditioning). The conditioned tar sand pulp is screened to remove rocks and unconditionable lumps of tar sands and clay. The reject material "screen oversize," is discarded. The screened pulp is further diluted with water to promote two settling processes: globules of bitumen, essentially mineral-free, settle (float) upward to form a coherent mass of froth on the surface of the separation cells; and, at the same time, mineral particles, particularly the sand size mineral, settle down and are removed from the bottom of the separation cell as tailings. The medium through which these two settling processes take place is called the middlings. Middlings consist primarily of water, with suspended fine material and bitumen particles.

The particle sizes and densities of the sand and of the bitumen particles are relatively fixed. The parameter which influences the settling processes most is the viscosity of the middlings. Characteristically, as the fines content rises above a certain threshold (which varies according to the composition of the fines), viscosity rapidly achieves high values with the effect that the settling processes essentially stop. In this operating condition, the separation cell is said to be "upset." Little or no oil is recovered, and all streams existing the cell have about the same composition as the feed.

As feed fines content increases, more water must be used in the process to maintain middlings viscosity within the operable range. For most feeds, over a wide range of fines contents, a clay-water ratio of approximately 0.1 represents the upper limit of operability.

The third step of the hot water process is scavenging. The feed fines content sets the process water requirement through the need to control middlings viscosity which, as noted above, is governed by the clay/water ratio. It is usually necessary to withdraw a drag stream of middlings to maintain the separation cell material balance, and this stream of middlings can be scavenged for recovery of incremental amounts of bitumen. Air flotation is an effective scavenging method for this middlings stream.

Final extraction or froth clean-up is usually accomplished by centrifugation. Froth from primary extraction is diluted with naptha, and the diluted froth is then subjected to a two stage centrifugation. This process yields an oil product of an essentially pure (diluted) bitumen. Water and mineral removed from the froth constitute an additional tailing stream which must be disposed of.

In the terminology of extractive processing, tailings is the throwaway material generated in the course of extracting the valuable material from an ore. In tar sands processing, tailings consist of the whole tar sand ore body plus net additions of process water less only the recovered bitumen product. Tar sand tailings can be subdivided into three categories; vis: (1) screen oversize, (2) sand tailings (the fraction that settles rapidly), and (3) tailings sludge (the fraction that settles slowly). Screen oversize is typically collected and handled as a separate stream.

Tailings disposal includes all of the operations required to place the tailings in a final resting place. One obvious long-range goal of tailings disposal is to return the tailings to the mined out area in a satisfactory form. Thus, there are two main operating modes for tailings disposal: (1) dike building which involves hydraulic conveying of tailings followed by mechanical compaction of the sand tailings fraction; and (2) overboarding which involves hydraulic transport with no mechanical compaction.

Recently, in view of the high level of ecological consciousness in Canada and the United States, technical interest in tar sands operation has begun to focus on tailings disposal. The concept of tar sands tailings disposal is straightforward. Visualize mining one cubic foot of tar sands which leaves a one cubic foot hole in the ground. The ore is processed to recover the resource (bitumen) and the remainder, including both process material and the gangue constitutes the tailings which are not valuable and are to be disposed of. In tar sands processing, the main process material in water and the gangue is mostly sand with some silt and clay. Physically, the tailings consists of a solid part (sand tailings) and a more or less fluid party (sludge). The most satisfactory place to dispose of these tailings is, of course, the existing one cubic foot hole in the ground. It turns out, however, that the sand tailings alone from the one cubic foot of ore occupy just about one cubic foot. The additional amount of sludge is variable, depending on ore quality and process conditions, but may run up to 0.3 cubic feet. Thus, the tailings simply will not fit back into the original hole in the ground.

This historical literature covering the hot water process for the recovery of bitumen from tar sands contains little in the way of a recognition that a net accumulation of liquid tailings or sludge would occur. Based on analysis of field test unit operations which led to the oil sands plant design near Ft. McMurray, Alberta, the existence of sludge accumulation was predicted. This accumulation came to be called the "pond water problem." Observations during start-up and early commercial operations at Ft. McMurray (1967-69) were of insufficient precision to confirm the prediction. Since 1969, commercial operating data have confirmed the accumulation in the tailings disposal area of a layer of fine material and water (sludge) which settles and compacts only very slowly, if at all, after a few years.

For dike building at the tar sands plant tailings are conveyed hydraulically to the disposal area and discharged onto the top of a sand dike which is constructed to serve as an impoundment for a pool of liquid contained inside. On the dike, sand settles rapidly, and a slurry of fines, water, and minor amounts of bitumen flows into the pond interior. The settled sand is mechanically compacted to build the dike to a higher level. The slurry which drains into the pond interior commences stratification after an induction period of about a month or more and settling occurs over a time scale of months to years. As a result of this long-term settling, two layers form. The top 5 to 10 feet of the pool are a layer of relatively clear water containing 0 to 5 wt.% solids. Below this clear water layer is a discontinuity in solids content. Over a matter of a few feet, solids content increases to 10-15 wt.%, and thereafter, solids content increases regularly toward the pond bottom. In the deepest parts of the pond, solid contents of over 50 wt.% have been recorded. This second layer is called the sludge layer. The solids content of the sludge layer increases regularly from top to bottom by a factor of 4-5. The clay-water ratio in this layer increases also, but by a lower factor 1.5-2.5. The clays, dispersed during processing, apparently have partially reflocculated into a very fragile gel network. Through this gel, fines of larger-than-clay sizes are slowly settling.

Overboarding is the operation in which tailings are discharged over the top of the sand dike directly into the liquid pool. A rapid and slow settling process occur, but their distinction is not as sharp as in dike building and no mechanical compaction is carried out. The sand portion of the tailings settles rapidly to form a gently sloping beach extending from the discharge point toward the pond interior. As the sand settles, fines and water drain into the pool and commence long-term settling.

In summary: (1) tar sands contain clay minerals, (2) in the hot water extraction process, most of the clays become dispersed in the process streams and traverse the circuit, exiting in the tailings, (3) the amount of process water input is fixed by the clay content of the feed and the need to control viscosity of the middlings stream, (4) the amount of water required for middlings viscosity control represents a large volume relative to the volume of the ore itself, and (5) upon disposal, clays settle only very very slowly; thus, the process water component of tailings is only partially available for reuse via recycle. That which can't be recycled represents a net accumulation of tailings sludge.

Thus, to alleviate the pond water problem it is necessary to devise long-term economically and ecologically acceptable means to eliminate, minimize, or permanently dispose of, the accumulation of liquid tailings or sludge.

Flocculation of the drag stream in order to improve the settling characteristics thereto has been proposed and practiced in the prior art. In flocculation, individual particles (in this case clay particles) are united into rather loosely bound agglomerates or flocs. The degree of flocculation is controlled by the probability of collisions between the clay particles and their tendency toward adhesion after collision. Agitation increases the probability of collision and adhesion tendency is increased by the addition of flocculants.

Reagents act as flocculants through one or a combination of three general mechanisms: (1) neutralization of the electrical repulsive forces surrounding the small particles which enables the van der Waals cohesive force to hold the particles together once they have collided; (2) precipitation of voluminous flocs, such as metal hydroxides, that entrap fine particles; and (3) bridging of particles by natural or synthetic, long-chain, high-molecular-weight polymers. These polyelectrolytes are believed to act by absorption (by ester formation or hydrogen bonding) or hydroxyl or amide groups on solid surfaces, each polymer chain bridging between more than on solid particle in the suspension.

Among the various reagents which have been found useful for flocculating clay are: alumimum chloride, polyalkylene oxides, such as polyethylene oxide, compounds or calcium such as calcium hydroxide, calcium oxide, calcium chloride, calcium nitrate, calcium acid phosphate, calcium sulfate, calcium tartrate, calcium citrate, calcium sulfonate, calcium lactate, the calcium salt of ethylene diamine tetraacetate and similar organic sequestering agents. Also useful are quartz flour or a high molecular weight acrylamide polymer such as polyacrylamide or a copolymer or acrylamide and a copolymerizable carboxylic acid such as acrylic acid. Additional flocculants which have been considered include the polymers of acrylic or methacrylic acid derivatives, for example, acrylic acid, methacrylic acid, the alkali metal and ammonium salts of acrylic acid or methacrylic acid, acrylamide, methacrylamide, the aminoalkyl acrylates, the aminoalkyl methacrylamides and the N-alkyl substituted aminoalkyl esters of either acrylic or methacrylic acids.

Those skilled in the art will understand that a satisfactory solution to the "pond water problem" must be economically, as well as ecologically acceptable. A distinct step forward in the art was achieved by the use of hyrdolyzed corn and potato starch flocculants as set forth in copending U.S. application Ser. No. 145,296, now issued as U.S. Pat. No. 4,330,409 entitled Destabilization of Sludges with Hydrolyzed Starch Flocculants. The disclosure of this patent, which is hereby incorporated by reference, points out the advantages of using as a flocculant a hydrolyzed wheat, corn or potato starch obtained by the aqueous hydrolysis of the starch in the presence of one or more insoluble metal salts formed in situ and such flocculants will be used in conjunction with this invention.

OBJECTS OF THE INVENTION

It is, therefore, an object of this invention to provide a method for enhancing the settling of sludge solids in tar sands tailings.

A further object is to reduce the induction period which is frequently associated with settlement of sludge solids and which induction period may be due to additives and processing techniques used in bitumen recovery.

A still further object of the invention is to improve the settling of sludge solids with and without flocculants and to optionally employ dewatering techniques with the enhanced settling techniques of the invention.

BRIEF SUMMARY OF THE INVENTION

It has now been found that settlement of the solids in the sludge from the tar sands tailings ponds is significantly accelerated by removal of carbonate and bicarbonate ions present in the sludge environment. More specifically, the induction period often required before settlement of the solids in the sludge basins is reduced or eliminated in proportion to the amount of carbonate and bicarbonate anions removed. In accord with the invention, the removal of carbonate and bicarbonate ions are removed from the sludge and a flocculant added whereby the flocculation process is enhanced by removal or elimination of the induction period before settlement begins.

DETAILED DESCRIPTION OF THE INVENTION

As indicated above, this invention reduces or eliminates the induction period for settlement of tar sands tailings solids by removal of carbonate and bicarbonate ions from the system. This may be accomplished in several ways, as for example by use of an appropriate ion exchange resin to sorb the carbonate and bicarbonate ion, by addition of a precipitant for these ions, and/or by use of a mineral acid to evolve $CO_2$ from the system. Because ion exchange resins are expensive, they are not preferred and generally will not be used. A suitable precipitant is lime or other inexpensive calcium compound. Most preferably, however, a simple mineral acid such as hydrochloric acid will be used for the process whereby the carbonate and bicarbonate ions are converted to $CO_2$ which, after $CO_2$ saturation in the aqueous phase is reached, simply passes from the sludge in gaseous form.

In adding the agent to reduce or remove the carbonate and bicarbonate ions, it is not critical how much to add. Preferably, however, an effective amount will be used to remove essentially all of these ions without any significant excess over that needed. This is readily determined by simple titration of a sample to find the amount of carbonate present and then calculate the amount of additive necessary to remove it.

It may be noted here that Canadian Pat. No. 892,548 discloses that in the treatment of hot water discharge of tar sands processing, flocculation is preferably accomplished by changing the pH of the water and the water is reduced in pH with sulphuric acid from about 7.5 to 9.0 to below about 7.5. The disclosure of this patent is in no way concerned with the sedimentation rate problem which is met by subject invention.

Also of interest is Canadian Pat. No. 1,000,632 where the effluent from hot water processing of tar sands is first made alkaline with carbonates and/or bicarbonates and then acidified to a pH of 6.0 to 7.9 with an inorganic acid and aerated. Again, there is no appreciation of the problems solved by this invention.

Canadian Pat. No. 882,668 discloses a method of contacting the effluent discharge water with an ion-exchange resin to reduce divalent and trivalent cations therein, particularly $Mg+$ and $Ca+$.

In Canadian Pat. No. 1,021,885 a waste water containing clay from tar sands processing is treated with acid to a pH or less than 7.5 and a freeze-thaw cycle is used to agglomerate clay.

In the process of subject invention the sands tailings are simply treated with an effective amount, preferably a stoichiometric amount, of mineral acid to neutralize the carbonate and bicarbonate ions present. This will be done in conjunction with the starch flocculants disclosed in U.S. Pat. No. 4,330,409.

It is also useful to employ sand surcharge dewatering with or without added flocculants. Sand surcharge dewatering involves the addition of sand to the mass of stationary tailings and as it sinks to the bottom, presses down on the sludge, effecting a compaction and squeezing water out. It has been found that by removing carbonates in accord with this invention the yield point of the sludge is increased so that compaction of the sludge is enhanced by the addition of sand. It is also frequently helpful to add an alcohol to the tailings in the separation zone to maintain high permeability for sand penetration. These techniques are also described in U.S. Pat. No. 4,330,409.

It has been found that the preferred starch flocculants for use in the process of this invention are made from potato and wheat starches and these are essentially equivalent in their effect. Most preferred are $AlPO_4$ potato starch and calcium aluminum phosphate wheat starch prepared by forming the insoluble salts in situ as described in U.S. Pat. No. 4,330,409.

In order to further illustrate the process of the invention the following examples are given:

GENERAL EXPERIMENTAL PROCEDURE

Samples of tar sands tailings from a commercial plant recovering bitumen from tar sands are placed in a one liter tubular jar. Then the desired agent to effect treatment is added and the tube shaken by turning it upside down and back to its original position for five cycles to ensure thorough mixing. The treated material is then observed immediately for settlement of the solids. A determination of time for settlement of sludge and other parameters are made in order to obtain a semi-quantitative evaluation.

EXAMPLE 1

Tailings from a tar sands recovery operation containing 2.9% mineral solids, 0.3% bitumen, and 96.8% water are treated with varying amounts of HCl. The maximum amount added is based on titration techniques to completely neutralize bicarbonates and carbonates. The total amount of $HCO_3^-$ and $CO_3^=$ in the pore fluid is observed to be 10.0 meq/L (9.2 $HCO_3^-$ and 0.8 $CO_3^=$). Therefore 10.8 meq of acid is required to completely neutralize $HCO_3^-$ and $CO_3^=$. The analysis of sedimentation data is carried out using the Kynch method described in Transactions of the Faraday Society, 48: 166–176, 1952. All testing is performed in 1-liter cylinders in which the sample height is 35 cm. A typical settling curve is shown in the FIGURE and, as will be seen from the data, the effect of the invention is to significantly reduce or eliminate the induction time ($t_i$) and to reduce the intercept time ($t_u$) so that settling of the solids is accelerated.

TABLE 1

Kynch analysis on tailings treated with varying amounts of hydrochloric acid

| HCl added as % of maximum | Final Mineral Solids after 5 weeks | $t_u$ (days) | $t_i$ (days) | Unit Area* requirement ($Ft^2$/ton/day) |
|---|---|---|---|---|
| 100 | 15.6 | 0.42 | 0.0 | 719 |
| 75 | 12.8 | 0.65 | 0.0 | 1113 |
| 55 | 11.4 | 0.79 | 0.09 | 1338 |
| 28 | 8.6 | 1.9 | 3.0 | 3253 |
| 10 | 11.3 | 5.4 | 5.7 | 9535 |
| 0 | 10.2 | 4.2 | 23.2 | 7053 |

*Unit area requirements are calculated by neglecting induction time $t_i$ required to initiate settling and by using the equation:

$$Ft^2/ton/day = \frac{t_u}{C_o h_o}$$ where $C_o$ = initial solids concentration, and $t_u$ = intercept time and $h_o$ = height of water-tailings interface.

EXAMPLE 2

Tests involving the addition of slaked lime ($Ca(OH)_2$) to tar sand tailings containing 1.3% mineral solids, 0.07% bitumen, and 98.63% water show that the minimum amount of lime required to reduce induction time to below 2 hours is 600 ppm (16.2 meq/L). However, in order to completely remove bicarbonate and carbonate anions from the pore fluid, it is observed that 800 ppm (21.6 meq/L) of lime is required. The lime requirement is observed to be about 45% more than the $CO_3^{--}$ and $HCO_3^-$ present, which is normal when one considers the possibility that $CaCO_3$ formed can precipitate on $Ca(OH)_2$ grains. Table 2 shows how a combination of lime and the hydrolyzed $AlPO_4$ potato starch flocculant disclosed in U.S. Pat. No. 4,330,409 gives faster flocculation and reduces the unit area of the solids formed.

TABLE 2

Kynch curve analysis with the addition of lime with and without starch flocculant

| Treatment | | | |
|---|---|---|---|
| Lime (ppm) | Starch Flocculant (ppm) | $t_u$ (days) | Unit Area sq ft/ton solids/day |
| 600 | 0 | 0.062 | 250 |
| 600 | 50 | 0.041 | 166 |
| 800 | 0 | 0.065 | 258 |
| 800 | 50 | 0.028 | 113 |

EXAMPLE 3

A permeability test is performed on terminal sludge subjected to various treatments to decarbonate the sludge pore fluid. The permeability is determined by a standard refiltration test which is carried out under a suction of 5 dm Hg. The initial mineral solids content in the sludge is 31.1%, bitumen 3.2% and 65.7% water. The initial $CO_3^{--}$ and $HCO_3^-$ in the pore fluid is 2.0 and 8.0 meq/L respectively as determined by titration with $H_2SO_4$, using phenolphthalein and methyl orange respectively as end point indicators.

The test results are shown in Table 3 which show increased mineral solids concentrations obtained by reducing the $CO_3^=$ and $HCO_3^-$ concentration by any of the several techniques used (e.g. mineral acid, NaOH, $Ca(OH)_2$, and mineral acid plus the calcium aluminum phosphate wheat starch flocculant of U.S. Pat. No. 4,330,409. The highest permeability is obtained when there is no carbonate or bicarbonate present in the sludge pore fluid. High permeability is an indication of high dewatering rate.

TABLE 3

Effect of decarbonation with various chemical treatments on permeability measured under a suction of 5 cm Hg

| Treatment and Dosage | Mineral Solids conc. after 5 cm $H_g$ vacuum, w/w | Concentration in the filtrate of | | Permeability $10^{-8}$ cm/sec |
|---|---|---|---|---|
| | | $CO_3^=$ (meq/L) | $HCO_3^-$ (meq/L) | |
| None | 42.8 | 2.0 | 8.0 | 2.08 |
| HCl(12 meq/L) | 48.4 | 0.0 | 0.0 | 12.0 |
| HCl(12 meq/L) + NaOH(12 meq/L) | 50.8 | 0.0 | 1.5 | 7.61 |
| HCl(12 meq/L) + Ca(OH)$_2$(12 meq/L) | 49.6 | 0.0 | 1.25 | 1.18 |
| Ca(OH)$_2$(21.6 meq/L) | 44 | 2.0 | 6.71 | 2.40 |
| HCl(12 meq/L) + Ca(OH)$_2$(12 meq/L) + starch flocc. 200 ppm | 50.1 | 0.0 | 6.75 | 8.97 |

We claim:

1. A process for reducing the time for settlement during flocculation of a tailings sludge containing mineral solids obtained from recovery of bitumen from tar sands wherein said sludge, when treated with a starch flocculant, has an induction time before settlement begins, which comprises adding an additive to said sludge to remove essentially all of the carbonate and bicarbonate ions present in said sludge and then adding as said starch flocculant, an effective amount of a hydrolyzed wheat, corn or potato starch obtained by the aqueous hydrolysis of the starch in the presence of an insoluble metal salt formed in-situ, and settling the solids from the sludge.

2. The process of claim 1 wherein the carbonate and bicarbonate ions are removed by a precipitant for said ions.

3. The process of claim 2 wherein the precipitant is lime.

4. The process of claim 1 wherein said carbonate and bicarbonate ions are removed by addition of a mineral acid.

5. The process of claim 4 wherein the mineral acid is hydrochloric acid.

6. The process of claim 5 wherein the starch is a wheat starch.

7. The process of claim 5 wherein the starch is potato starch.

8. The process of claim 5 wherein the starch is corn starch.

9. The process of claim 1 wherein an alcohol added to the starch hydrolysate is used to enhance flocculation.

10. The process of claim 1 wherein sand surcharging is used to effect a compaction of the sludge.

11. The process of claim 1 wherein the starch is a calcium aluminum phosphate wheat starch.

12. The process of claim 1 wherein the starch is AlPO$_4$ potato starch.

* * * * *